United States Patent
Li et al.

(10) Patent No.: US 10,056,755 B2
(45) Date of Patent: Aug. 21, 2018

(54) MULTI-SOURCE ENERGY STORAGE SYSTEM AND ENERGY MANAGEMENT AND CONTROL METHOD

(71) Applicant: GENERAL ELECTRIC COMPANY, Schenectady, NY (US)

(72) Inventors: Fei Li, Shanghai (CN); Pengcheng Zhu, Shanghai (CN); Pengju Kang, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 204 days.

(21) Appl. No.: 15/086,744

(22) Filed: Mar. 31, 2016

(65) Prior Publication Data
US 2016/0294182 A1  Oct. 6, 2016

(30) Foreign Application Priority Data
Mar. 31, 2015  (CN) .......................... 2015 1 0148732

(51) Int. Cl.
*H02J 1/00* (2006.01)
*B60L 11/18* (2006.01)
(Continued)

(52) U.S. Cl.
CPC ............. *H02J 1/00* (2013.01); *B60L 11/1868* (2013.01); *H02M 3/158* (2013.01); *H02J 3/28* (2013.01);
(Continued)

(58) Field of Classification Search
CPC ................................ H02J 1/00; B60L 11/1868
(Continued)

(56) References Cited

U.S. PATENT DOCUMENTS 5,264,764 A   11/1993   Kuang
5,318,142 A   6/1994   Bates et al.
(Continued)

FOREIGN PATENT DOCUMENTS

CN   101896373 A   11/2010
CN   102005810 A   4/2011
(Continued)

OTHER PUBLICATIONS

Dai et al., "A Study on Lead Acid Battery and Ultra-Capacitor Hybrid Energy Storage System for Hybrid City Bus", Optoelectronics and Image Processing (ICOIP), 2010 International Conference on (vol. 1), pp. 154-159, Nov. 11-12, 2010, Haiko.
(Continued)

*Primary Examiner* — Thomas Skibinski
(74) *Attorney, Agent, or Firm* — Meagher Emanuel Laks Goldberg & Liao LLP

(57) ABSTRACT

A multi-source energy storage system, it includes a first energy storage system, a second energy storage system, and a second DC/DC converter and controller and a method for supplying power to an electrical load from multiple energy storage systems. The first energy storage system can be coupled to an electrical load. The second DC/DC converter and controller can be coupled between at least one of the following: a second energy storage system and a first energy storage system or electrical load. The controller settings control the first and second energy storage systems and the second DC/DC converter runs in both precharge mode and normal mode. In the precharge mode, the first energy storage system charges the second energy storage system via the second DC/DC converter. In normal mode, the second energy storage is coupled to the electrical load via the second DC/DC converter.

18 Claims, 8 Drawing Sheets

(51) Int. Cl.
*H02M 3/158* (2006.01)
*H02J 3/28* (2006.01)

(52) U.S. Cl.
CPC ........ *Y02T 10/7005* (2013.01); *Y02T 10/7066* (2013.01)

(58) Field of Classification Search
USPC .......................... 307/82, 43; 180/65.1; 318/3
See application file for complete search history.

(56) References Cited

U.S. PATENT DOCUMENTS

| | | |
|---|---|---|
| 7,595,597 B2 | 9/2009 | King et al. |
| 7,633,271 B2 | 12/2009 | Schulte et al. |
| 8,120,290 B2 | 2/2012 | King |
| 8,245,801 B2 | 8/2012 | Flett |
| 8,342,272 B2 | 1/2013 | Gee |
| 8,378,623 B2 | 2/2013 | Kusch et al. |
| 8,511,407 B2 | 8/2013 | Jeon et al. |
| 8,818,601 B1 | 8/2014 | Gv et al. |
| 8,836,251 B2 | 9/2014 | Tabatabaei |
| 2007/0158118 A1* | 7/2007 | King ........................ B60K 6/48 180/65.1 |
| 2011/0100735 A1 | 5/2011 | Flett |
| 2011/0115288 A1 | 5/2011 | Lee |
| 2012/0025768 A1 | 2/2012 | Nakano et al. |
| 2012/0200152 A1 | 8/2012 | Schneider et al. |
| 2012/0255799 A1 | 10/2012 | Kohler et al. |
| 2013/0038249 A1* | 2/2013 | Tabatabaei ............... B60L 1/20 318/3 |
| 2013/0106187 A1* | 5/2013 | Gemin ..................... B60L 7/14 307/43 |
| 2013/0307489 A1 | 11/2013 | Kusch et al. |
| 2014/0244082 A1 | 8/2014 | Caron |

FOREIGN PATENT DOCUMENTS

| | | |
|---|---|---|
| CN | 102700432 B | 9/2014 |
| DE | 102010008917 A1 | 8/2011 |
| EP | 2226215 A1 | 9/2010 |
| EP | 2353925 A2 | 8/2011 |
| WO | WO2009078328 A1 | 6/2009 |
| WO | 2013102784 A1 | 7/2013 |
| WO | 2014091238 A2 | 6/2014 |
| WO | 2014209377 A1 | 12/2014 |

OTHER PUBLICATIONS

European Search Report and Written Opinion issued in connection with corresponding EP Application No. 16162905.0-1807 dated Sep. 8, 2016.
European Search Report and Written Opinion issued in connection with related EP Application No. 16162903.5-1807 dated Sep. 8, 2016.
Fei Li, U.S. Appl. No. 15/087,400, filed Mar. 31, 2016.
First Office Action and Search issued in connection with corresponding CN Application No. 201510148732.X dated Dec. 4, 2017.
First Office issued in connection with corresponding MX Application No. MX/a/2016/004109 dated Oct. 25, 2017.

* cited by examiner

MULTI-SOURCE ENERGY STORAGE SYSTEM AND ENERGY MANAGEMENT AND CONTROL METHOD

CROSS-REFERENCE RELATED APPLICATIONS

The present application claims foreign priority benefits under 35 U.S.C. § 119 to Chinese Patent Application No. 201510148732.X filed Mar. 31, 2015 entitled "A MULTI-SOURCE ENERGY STORAGE SYSTEM WITH RANGE EXTENDER AND METHOD FOR ENERGY MANAGEMENT AND CONTROL" and is hereby incorporated by reference in its entirety.

BACKGROUND OF THE INVENTION

Embodiments of the present invention relate to an energy storage system and method for energy management and control, primarily for use in electrical systems such as vehicle drive systems, specifically a multi-source energy storage system and method for energy management and control.

As problems with pollution have become more serious, electric vehicles and renewable energy sources have become increasingly attractive. Pure electric vehicles are driven by power supplied to the electric motor using stored electrical energy. Pure electric vehicles can use one or more stored electrical energy sources. For example, a first electrical energy storage source, such as battery energy, can be used to provide longer lasting energy, and a second electrical energy storage source, such as a power battery, can be used to supply high powered energy, for use in accelerating, etc. Hybrid electrical vehicles are driven by a combination of an internal-combustion engine and an electric motor powered by an energy storage device (such as a traction battery). This combination runs by ensuring that the internal-combustion engine and the electric motor both operate at their highest efficiencies, increasing the overall fuel efficiency. For example, the efficiency of the electric motor is higher when accelerating from standstill and the efficiency of the internal-combustion engine is higher when the engine is running constantly over a period of time (for example, when driving on highways). Enhancing the initial acceleration of the electric motor allows the internal-combustion engine in hybrid vehicles to be smaller and more fuel-efficient.

If the size of high energy density batteries in pure battery-powered electric vehicles and plug-in hybrid vehicles are reasonable, then a single charge is sufficient to meet mileage requirements. However, due to their relatively low power densities, high energy density batteries of the same size might be unable to satisfy power requirements caused by instant acceleration or uphill driving. This is especially apparent in heavy-duty applications, such as city buses or trucks. In view of this, multiple energy sources or hybrid energy sources can be used to simultaneously satisfy mileage requirements and power requirements, without having to excessively increase the size of single high energy density batteries. As power batteries have a higher power density and longer service life, they can be used in combination with high energy density batteries as a hybrid power source in heavy-duty electric vehicles. However, when introducing multiple energy sources or hybrid energy sources into a vehicle's drive system, the allocation and control of these multiple or hybrid energy sources become complicated. The question of how to reasonably allocate and control multiple energy sources or hybrid energy sources to improve the efficient operation of a vehicle's drive systems and cope with a variety of working conditions still needs to be resolved within the industry.

Therefore, a system and method are required to resolve at least one of the problems above.

BRIEF DESCRIPTION OF THE INVENTION

One aspect of this invention is the provision of a multi-source energy storage system, which includes a first energy storage system, a second energy storage system, and a second DC/DC converter and controller. Of which the first energy storage system can be coupled to an electrical load. The second DC/DC converter can be coupled between at least one of the following: the second energy storage system and the first energy storage system or electrical load. The controller settings control the first and second energy storage systems and the second DC/DC converter runs in both the precharge mode and normal mode. In the precharge mode, the first energy storage system charges the second energy storage system via the second DC/DC converter. In the normal mode, the second energy storage couples to the electrical load via the second DC/DC converter.

Another aspect of the present invention is to provide a method, includes:
A multi-source energy storage system, whose operation includes a first energy storage system, a second energy storage system and a second DC/DC converter. In using the precharge mode, the first energy storage system charges the second energy storage system via the second DC/DC converter; and when operating the multi-source energy storage system in normal mode, the second energy storage supplies power to the electrical load via the second DC/DC converter.

The multi-source energy storage system and energy management control method in this invention are not only able to supply energy to electrical loads such as vehicle drive systems by means of multiple different storage systems to satisfy the various power requirements of the electrical load, enabling it to operate in different working conditions, but are also able to transfer energy between the different energy storage systems without affecting the normal operation of the system. For example, when the system is operating normally, the high energy density energy storage system (such as batteries) can precharge the high power density energy storage system (such as a super capacitor). The operator does not need to wait until the power density energy storage system has been precharged before starting the system. In addition, high efficiency precharging is possible without additional resistance, saving system power and increasing the system's power density.

BRIEF DESCRIPTION OF THE DRAWINGS

A clearer understanding of these and the other characteristics, aspects and advantages of this invention can be obtained by referring to the attached Figures when reading the following detailed explanation. In the attached Figures, the same element reference numbers are used to denote the same parts in all Figures.

FIG. 4 shows the status of this multi-source energy storage system in the precharge mode. FIG. 5 shows the status of this multi-source energy storage system in normal mode. FIG. 6 shows the status of this multi-source energy storage system in the fail-safe mode.

DETAILED DESCRIPTION

In order to help technicians in this field clearly understand this invention, the following combines Figures with a detailed description of the specific implementation of this invention. In the following detailed descriptions of specific implementation methods, this specification does not describe some commonly known functions or configurations in order to avoid unnecessary details affecting this invention's disclosure.

Unless otherwise defined, the technical or scientific terms used in this claim and specification will retain the ordinary meaning as understood by a layperson in the technical field of the present invention. "First", "second" and other similar words used in the present specification and the claim do not denote any order, quantity, or importance, but are simply used to distinguish different components. "A" or "a" and similar words do not mean a single unit, but indicate the presence of at least one unit. "Comprises" or "possesses" and other similar words imply that an element or object appearing before the "comprises" or "possesses" covers enumerated elements or objects and equivalents elements thereof appearing after the "comprises" or "possesses", without excluding other elements or objects. "Connected" or "coupled" and other similar words are not limited to physical or mechanical connections, but may include electrical connections, either in a direct or indirect manner.

One aspect of the examples of this invention involves a multi-source energy storage system that can be used to supply electrical power to an electrical load in the fields of electrical vehicles, smart networks, micro-networks, solar energy and wind power.

Figure 1:
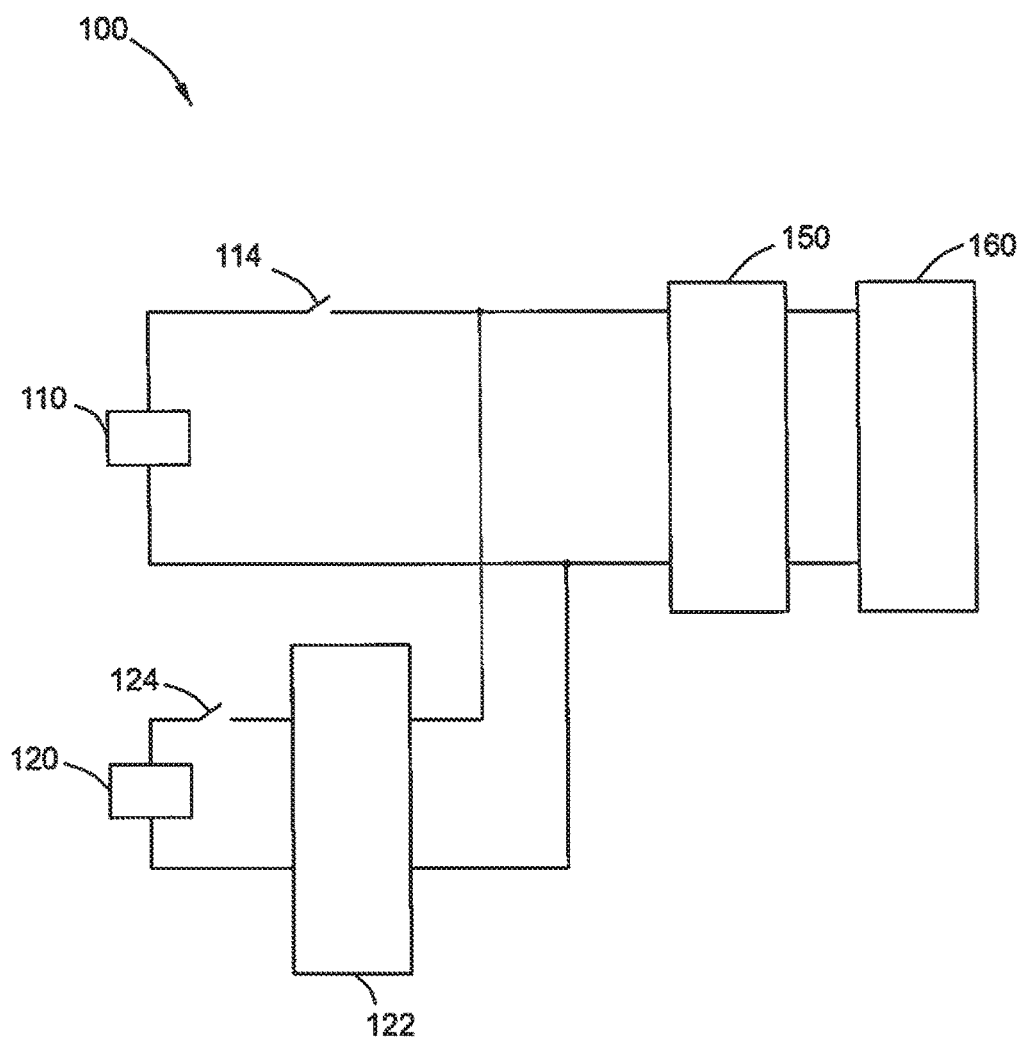
FIG. 1 shows a schematic block Figure of a possible multi-source energy storage system which embodies the method in this invention.

FIG. 1 shows a schematic block Figure of one possible multi-source energy storage system embodying the method in this invention. As shown in FIG. 1, the multi-source energy storage system 100 includes a first energy storage system 110 that can be selectively coupled to the electrical load 160, and a second energy storage system 120 that can be coupled to the electrical load 160 via a DC/DC converter 122. Of which, one terminal of the DC/DC converter 122 is coupled to the second energy storage system 120 and the other terminal is coupled to the first energy storage system 110 and the electrical load 160.

The multi-source energy storage system 100 also includes a controller 150, used to control the operation of the first and second energy storage systems, 100 and 120, and the converter 122 in different modes. For example, in some examples, the multi-source energy storage system 100 can be run in at least one precharge mode and one normal mode under the control of the controller 150. In the precharge mode, the first energy storage system 110 charges the second energy storage system 120 via the DC/DC converter 122. In normal mode, the second energy storage system 120 couples to the electrical load 160 via the DC/DC converter 160. In examples such as the one shown in FIG. 1, when in the precharge and normal mode, the first energy storage system 110 also couples with and supplies electrical power to the electrical load 160.

A switch device 114 can be fitted between the first energy storage system 110 and the electrical load 160 to enable selective coupling between the two. Similarly, a switch device can also be fitted between the second energy storage system 120 and the electrical load 160, or specifically, a switch device 124 can be fitted between the second energy storage system 120 and the DC/DC converter 122 to enable selective coupling between the two.

The first energy storage system described here can be a high energy density storage system, such as a high energy battery (lead-acid batteries, etc.), a generator, a fuel cell and a photovoltaic inverter, etc. The second energy storage system can be a high power storage system, such as a super capacitor, etc. The switch device can be any kind of switch or a combination of switch elements. The DC/DC converter refers to a voltage converter used to convert fixed DC voltage into variable DC voltage. The converter generally includes several major functional modules, such as a pulse width modulation (PWM) module, an error amplifier module and a comparator module.

Figure 2:
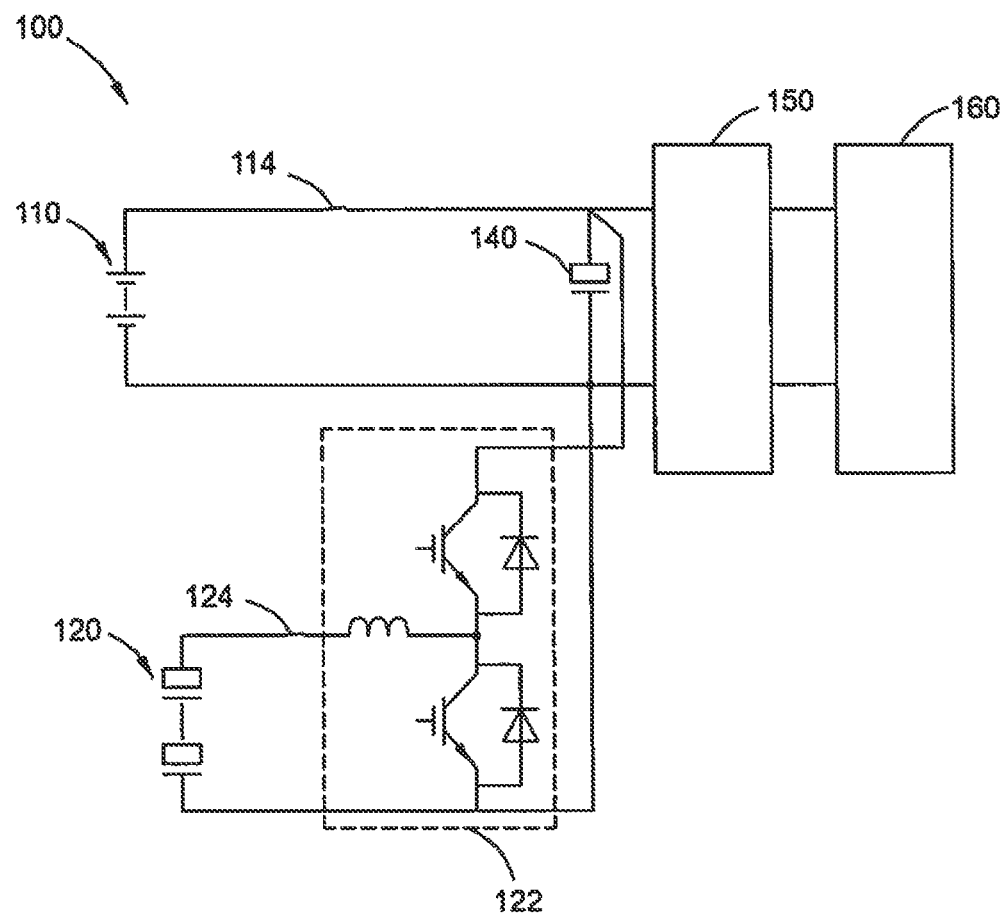
FIG. 2 shows a circuit schematic for a specific example of the multi-source energy storage system shown in FIG. 1.

FIG. 2 shows a circuit schematic for the specific example of the multi-source energy storage system 100 shown in FIG. 1. As shown in FIG. 2, the lead-acid battery 110 is used as the first energy storage system which can selectively couple to the electrical load 160 by means of the switch device 114. The super capacitor 120 is used as the second energy storage system which can selectively couple to the DC/DC converter 122 by means of the switch device 124, and couple to either the electrical load 160 or the lead-acid battery 110 via the DC/DC converter 122. Therefore, in the precharge mode, the lead-acid battery 110 can be controlled by the controller 150 so as to charge the super capacitor 120 via the DC/DC converter 122. In normal mode, the super capacitor 120 can be used to supply power to the electrical load 160 via the DC/DC converter 122. In addition, the multi-source energy storage system 100 also includes a capacitor 140 connected in parallel with the first energy storage system 110 and the second energy storage system 120, and is used to stabilize the output voltage of the multi-source storage system 100.

Figure 3:
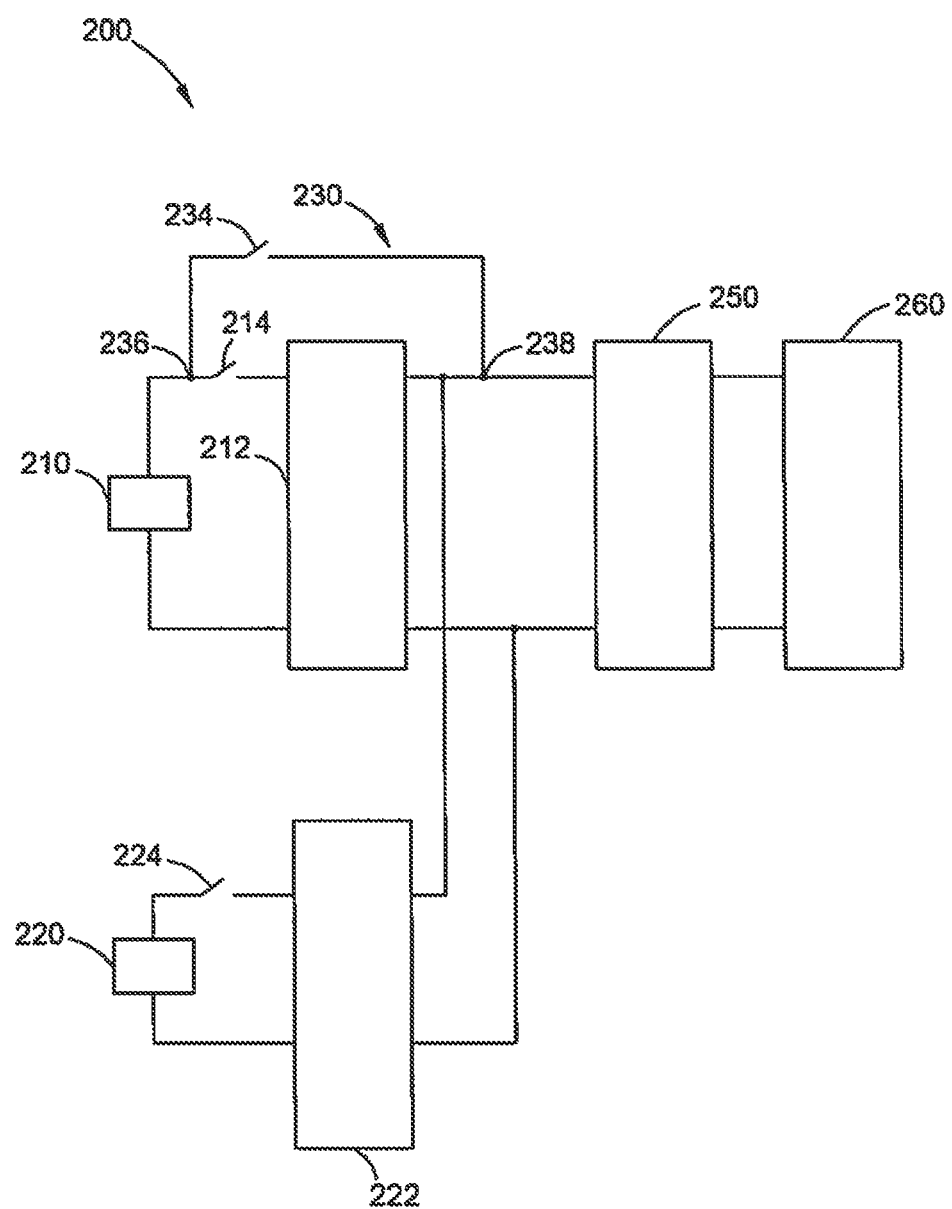
FIG. 3 shows another schematic block Figure of one possible multi-source energy storage system which embodies the method in this invention.

FIG. 3 shows a schematic block Figure of another possible multi-source energy storage system embodying the method in this invention. As shown in FIG. 3, the multi-source energy storage system 200 includes a first energy storage system 210 and a second energy storage system 220 that can be coupled to the electrical load 260 via the first DC/DC converter 212 and second DC/DC converter 222 respectively. The first and second DC/DC converters 212 and 222 are also coupled with each other. Specifically, one terminal of the first DC/DC converter 212 is coupled to the first energy storage system 210, and the other terminal is coupled to the second DC/DC converter 222 and the electrical load 260 via the node between the second DC/DC converter 222 and the electrical load 260. One terminal of the second DC/DC converter 222 is coupled to the second storage system 220, and the other terminal is coupled to the first DC/DC converter 212 and the electrical load 260 via the node between the first DC/DC converter 212 and the electrical load 260. The first switch device 214 is connected between the first energy storage system 210 and the first DC/DC converter 212 and the second switch device 224 is connected between the second energy storage system 220 and the second DC/DC converter 222.

The multi-source energy storage system 200 also includes a bypass 230 in parallel with the DC/DC converter 212. Via this bypass, the first energy storage system 210 can couple to the node between the second DC/DC converter 222 and electrical load 260 without passing through the first DC/DC converter 212. Thus, the first energy storage system 210 can be coupled to the second energy storage system via the second DC/DC converter, or directly to the electrical load 260. In the specific example shown in FIG. 3, the bypass 230 connects to the first node 236 located between the first energy storage system 210 and the first DC/DC converter 212, and the second node 236, located between the first and second DC/DC converters 212 and 222 and the electrical load 260. The bypass 230 can also include a switch device (the third switch device) 234. Compared to the converters 212 and 222, the resistance of the bypass 230 is negligible. In a specific example, the bypass 230 only includes the switch device 234 and does not include other elements with greater resistance. Thus, when using the first energy storage system 210 to precharge the second energy storage system 220 via the bypass 230, energy loss can be reduced to a minimum.

The multi-source energy storage system 200 also includes a controller 250, used to control the operation of the first and second energy storage systems 210 and 220, converters 212 and 222 and the bypass 230 in at least one precharge mode and one normal mode. In precharge mode, the first energy storage system 210 charges the second energy storage system 220 via the DC/DC converter 222. In normal mode, the second energy storage system 220 couples to the electrical load 260 via the DC/DC converter 222.

Figure 4:
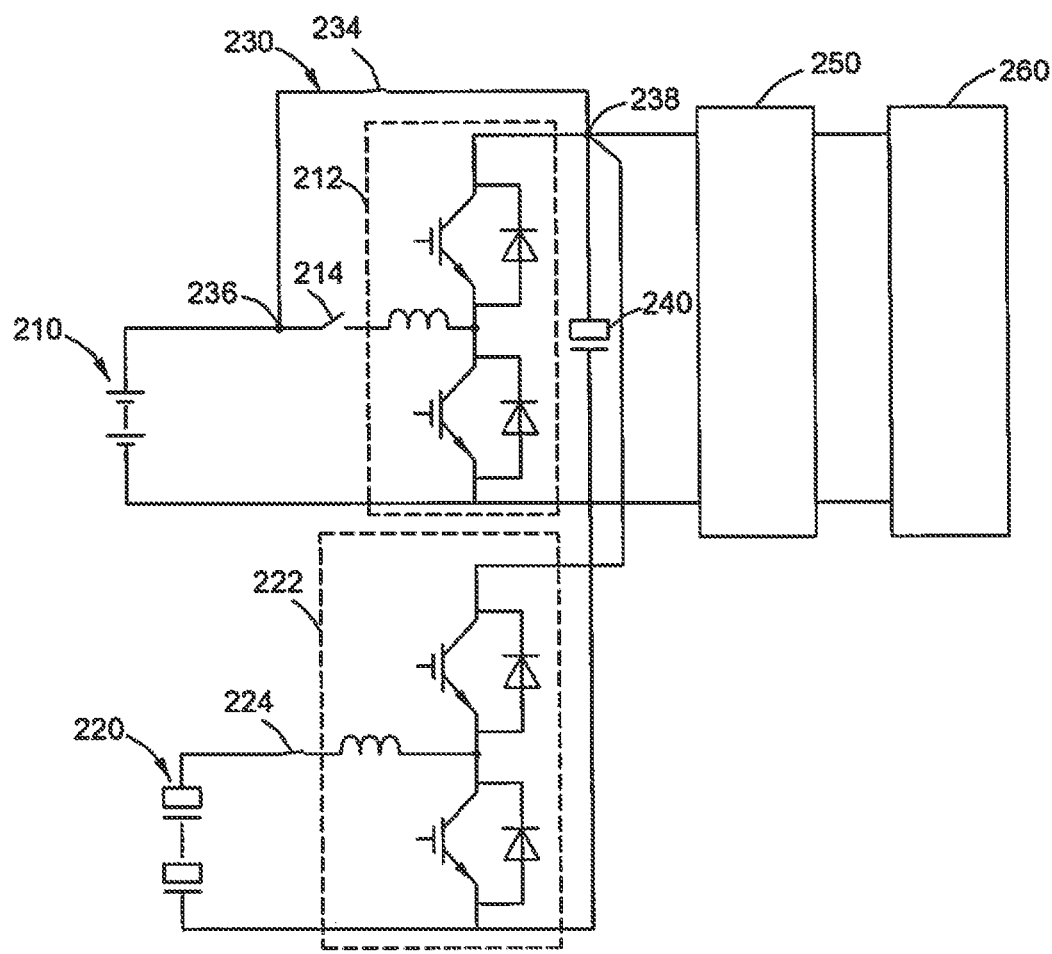
FIGS. 4, 5 and 6 show circuit schematics for specific examples of the multi-source energy storage system shown in FIG. 3.
Figure 5:
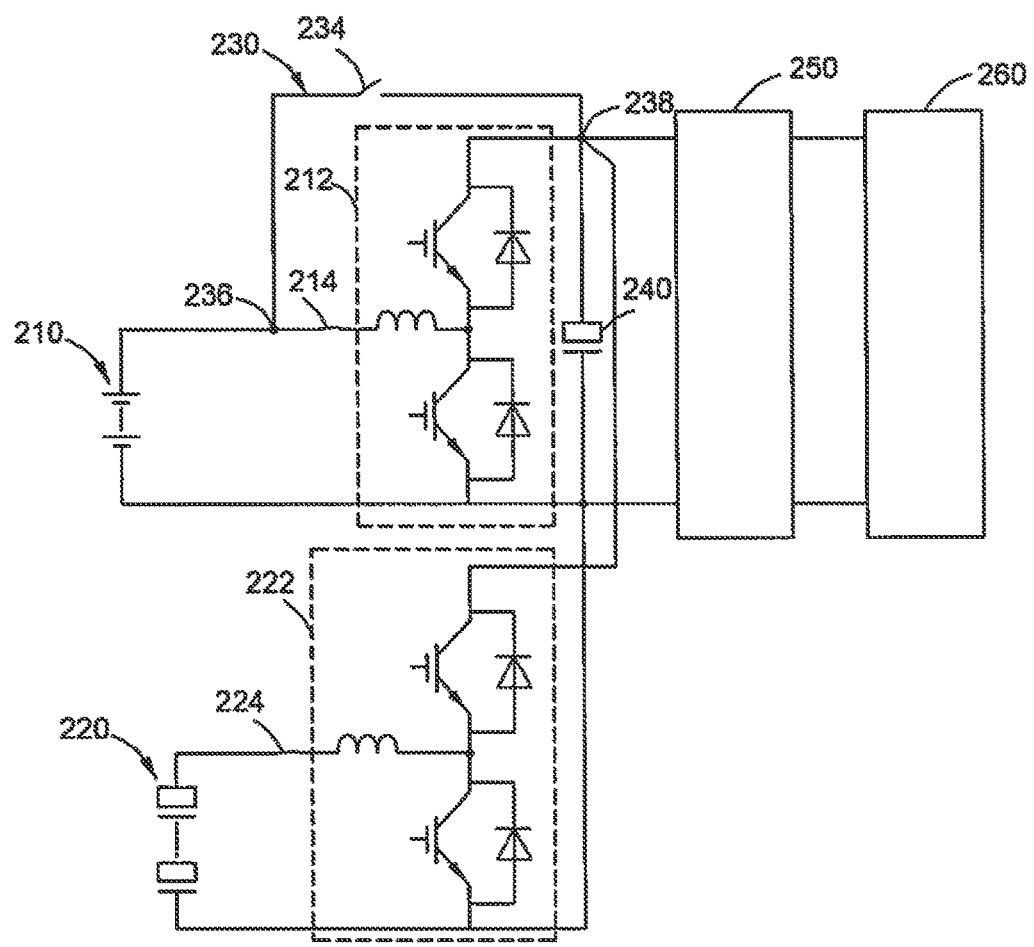

FIGS. 4 and 5 show a circuit schematic for a specific example of the multi-source energy storage system 200 shown in FIG. 3. FIG. 4 shows the status in precharge mode and FIG. 5 shows the status in normal mode.

In the precharge mode, as shown in FIG. 4, the first switch device 214 is disconnected and the second and third switch devices 224 and 234 are closed. The first energy storage system 210 supplies power to the electrical load 260 via the first DC/DC converter 212, while simultaneously charging the second energy storage system 220 via the second DC/DC converter 222. In normal mode, as shown in FIG. 5, the first and second switch devices 214 and 224 are closed and the third switch device 234 is disconnected. The first and second energy storage systems 210 and 220 couple to the electrical load 260 and supply power to the first and second DC/DC converters 212 and 222 respectively.

Figure 6:
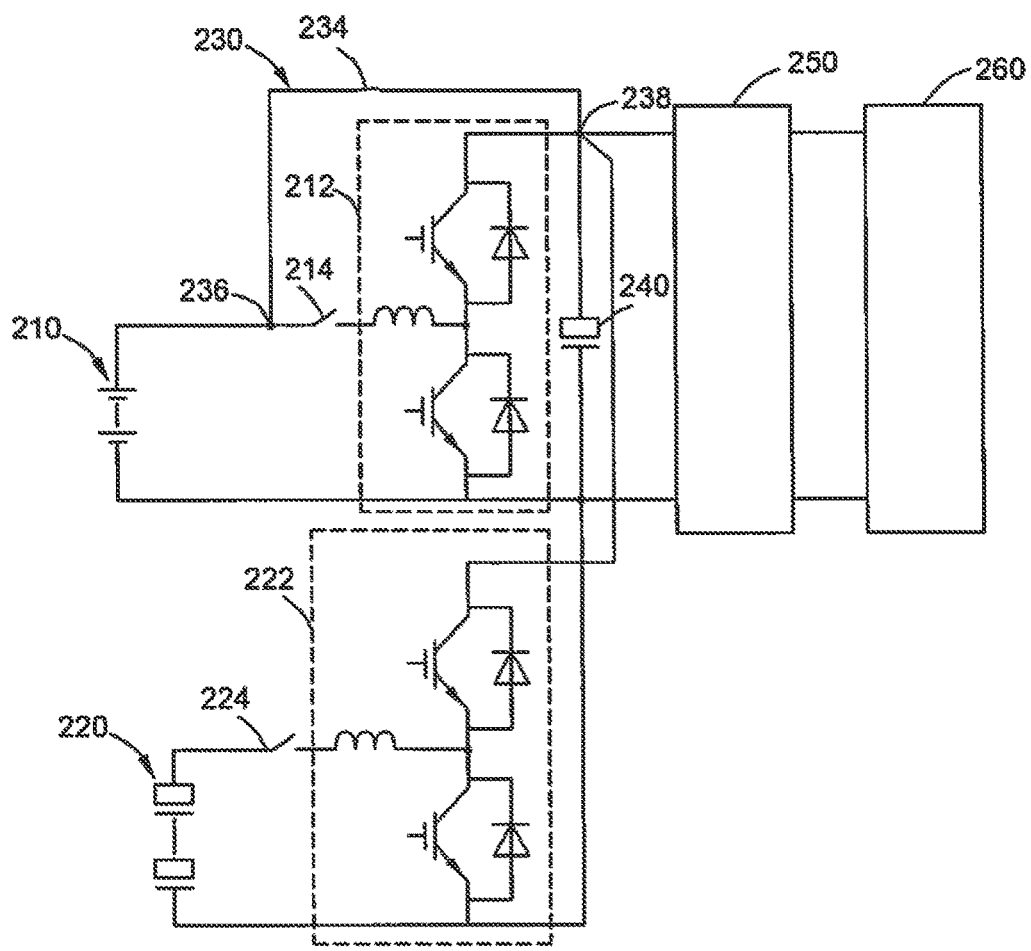

In addition, in some examples, under the control of the controller 250, the multi-source energy storage system 200 can operate in a further fail-safe mode. In the event that either the second energy storage system 220, the first DC/DC converter 212 or the second DC/DC converter 222 malfunctions, the fail-safe mode can be started, discontinuing use of the second energy storage system 220, the first DC/DC converter 212 and the second DC/DC converter 222, using only the first energy storage system 210 to directly supply power to the electrical load 260. As shown in FIG. 6, in the fail-safe mode, the first and second switch devices 214 and 224 are disconnected and the third switch device 234 is closed. The first energy storage system 210 is used to supply power to the electrical load 260 via the bypass 230 and the second energy storage system 220 is decoupled from the electrical load 260.

Figure 7:
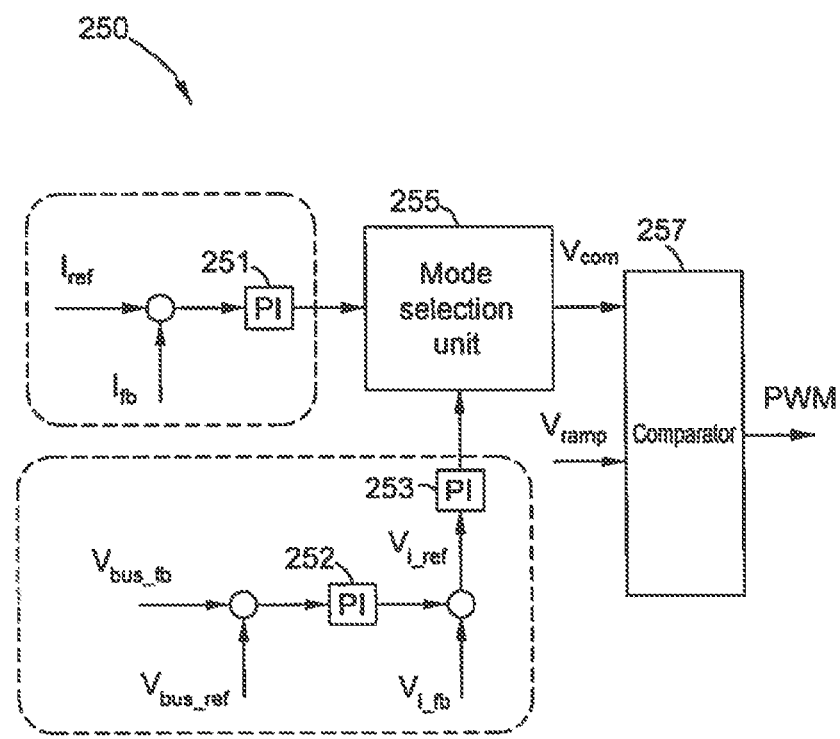
FIG. 7 shows the schematic block Figure for a specific example of the multi-source energy storage system controller shown in FIG. 3.

FIG. 7 shows the schematic block Figure for a specific example of the multi-source energy storage system 200 controller 250. As shown in FIG. 7, the controller 250 can include a regulator 251, used to receive a reference current Iref and a sample current Ifb obtained from an input current sample from the second DC/DC converter 222 and regulate the input of the second DC/DC converter 222 based on the reference current Iref. For example, the input current of the second DC/DC converter 222 can be adjusted to the reference current Iref. The controller 250 can also include the regulators 252 and 253. Regulator 252 is used to regulate the bus voltage Vbus of the first energy storage system 210 based on the reference voltage Vbus_ref, producing a reference voltage Vi_ref. Regulator 253 is used to regulate the voltage Vi_fb across the two terminals of the second energy storage system 220 based on the reference voltage Vi_ref.

In the specific example shown in FIG. 7, in addition to regulators 251, 252 and 253, the controller 250 also includes a mode selection unit 255 and a comparator 257. The mode selection unit 255 selects the data from either regulator 251 or 253 depending on the mode in which the multi-source energy storage system 200 is operating (precharge mode or normal mode), in order to obtain the necessary voltage Vcomp. The comparator 257 compares this voltage Vcomp with the reference sawtooth wave voltage Vramp provided by the PWM controller, in order to perform PWN control.

Specifically, in the precharging mode, the regulator 251 regulates the input current of the second DC/DC converter 222 based on the relevant output voltage of the output load from the second DC/DC converter 222 and the mode selection unit 255 obtains a suitable voltage Vcomp based on the data generated by the regulator 251, used to perform PWM control. In normal mode, the regulator 252 regulates the bus voltage Vbus of the first energy storage system 210 based on a reference voltage Vbus_ref, producing a reference voltage Vi_ref. Regulator 253 regulates the voltage Vi_fb across the two terminals of the second energy storage system 220 based on this reference voltage Vi_ref. The mode selection unit 255 obtains a suitable voltage Vcomp based on data produced by regulator 253, which is used to perform PWM control.

In all the example multi-source energy storage systems, one or more extra energy storage systems can be used in parallel with the first and second energy storage systems. For example, in some examples, the multi-source energy storage system can further include a third energy storage system that can be selectively coupled to the electrical load via a third DC/DC converter. The third energy storage system can be a fuel cell, a photovoltaic inverter, a generator or a combination of all these three.

Figure 8:
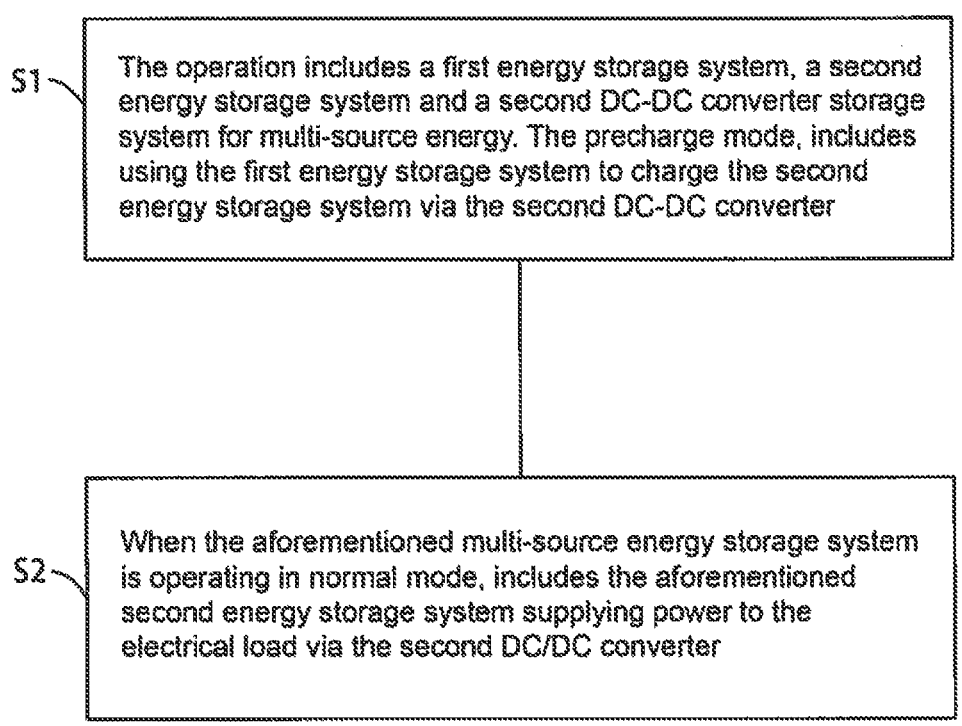
FIG. 8 shows the flow chart for the method of supplying power to an electrical load using the multi-source energy storage system as described above.

Another aspect of this invention is the energy management and control method for supplying power to an electrical load from multiple energy storage systems. In a specific example, as shown in FIG. 8, this method includes the following steps:

In step S1, the multi-source energy storage system, includes a first energy storage system, a second energy storage system and a second DC/DC converter, put into the precharge mode. In this step, the first energy storage system charges the second energy storage system via the second DC/DC converter.

In step S2, the multi-source energy storage system is put into normal mode. In this step, the second energy storage supplies power to the electrical load via the second DC/DC converter.

In some examples, step S1 also includes: using the first energy storage to supply power to the electrical load via a bypass parallel to the first DC/DC converter. In some of these examples, the bypass is connected to a first node located between the first energy storage system and the first DC/DC converter and a second node located between the first and second DC/DC converters and the electrical load. The resistance of the bypass is negligible compared to the first or second DC/DC converters. The bypass can also include a switch device.

In some examples, step S2 also includes: using the first energy storage to supply power to the electrical load via the first DC/DC converter.

In some examples, the multi-source energy storage system further includes a first switch device located between the first energy storage system and the first DC/DC converter, a second switch device located between the second energy storage system and the second DC/DC converter and a third switch device located in the bypass. In step S1, the first switch device is disconnected and the second and third switch devices are closed and in step S2, the first and second switch devices are closed and the third switch device is disconnected.

In some examples, step S1 further includes: regulating the input current of the second DC/DC converter based on the output load of the second DC/DC converter.

In some examples, step S2 includes: regulating the bus voltage of the first energy storage system, so that it basically remains constant when in normal mode.

In some examples, the energy management and control method further includes: when either the second energy storage system, the first DC/DC converter or the second DC/DC converter malfunction, the first energy storage system supplies power to the electrical load via the bypass and the second energy storage system and electrical load are decoupled.

This energy management and control system can use the previously mentioned methods or any of the multi-source energy storage systems from the examples. Specific features will not be repeated here.

The multi-source energy storage system and energy management control method in the examples of this invention allow the high energy density energy storage system to precharge the high power density energy storage system when operating under normal conditions. The operator does not need to wait until the power density energy storage system is precharged before starting the system. In addition, the charging circuit does not require additional resistance in the precharge mode, which saves system power and increases the system's power density.

Although the present invention is described with reference to specific implementation methods, technicians in the field should understand that many modifications and variations may be made for the present invention. Therefore, they should be aware that, intention of the claim lies in all the modifications and variations covered in the real concept and scope of the present invention.

What is claimed is:

1. A multi-source energy storage system, comprising:
   a first energy storage system selectively coupled to an electric load via a first DC-to-DC converter;
   a by-pass coupled to the first energy storage system and the electric load:
   a second energy storage system selectively coupled to the first energy storage system and the electric load via a second DC-to-DC converter;
   a first switch device coupled between the first energy storage system and the first DC-to-DC converter;
   a second switch device coupled between the second energy storage system and the second DC-to-DC converter; and
   a controller configured to operate the multi-source energy storage system in:
      a pre-charge mode to pre-charge the second energy storage system with the first energy storage system through the second DC-to-DC converter, wherein the first switch device is opened and the second switch device is closed; and
      a normal operation mode to couple the second energy storage system to the electric load via the second DC-to-DC converter, wherein the first switch device and second switch device are closed.

2. The multi-source energy storage system according to claim 1, wherein the by-pass links a first point between the first energy storage system and the first DC-to-DC converter, and a second point between both the first and second DC-to-DC converters and the electric load.

3. The multi-source energy storage system according to claim 1, wherein the by-pass comprises a third switch device.

4. The multi-source energy storage system according to claim 3, wherein, in the pre-charge mode, the third switch device is closed, and in the normal operation mode, the third switch device is opened.

5. The multi-source energy storage system according to claim 1, wherein the controller is further configured to regulate an input current of the second DC-to-DC converter based on an output load of the second DC-to-DC converter in the pre-charge mode.

6. The multi-source energy storage system according to claim 1, wherein the controller is further configured to regulate a bus voltage of the first energy storage system to maintain the bus voltage substantially constant in the normal operation mode.

7. The multi-source energy storage system according to claim 1, wherein the first energy storage system comprises at least one of a battery and an engine generator.

8. The multi-source energy storage system according to claim 1, wherein the second energy storage system comprises an ultra-capacitor.

9. The multi-source energy storage system according to claim 1, further comprising a third energy storage system selectively coupled to the electric load through a third DC-to-DC converter.

10. A method for operating a multi-source energy storage system, including a first energy storage system, a second energy storage system, a first DC-to-DC converter, a second DC-to-DC converter, a by-pass, a first switch device, and a second switch device, the method comprising:
    operating in a pre-charge mode to pre-charge the second energy storage system with the first energy storage system through the second DC-to-DC converter, wherein the first switch device is opened and the second switch device is closed; and
    operating in a normal operation mode to couple the second energy storage system to an electric load via the second DC-to-DC converter, wherein the first switch device and second switch device are closed.

11. The method according to claim 10, wherein operating the multi-source energy storage system in the normal operation mode further comprises powering the electric load by the first energy storage system through the first DC-to-DC converter.

12. The method according to claim 10, wherein operating the multi-source energy storage system in the pre-charge mode further comprises powering the electric load by the first energy storage system through the by-pass.

13. The method according to claim 12, wherein the by-pass links a first point between the first energy storage system and the first DC-to-DC converter, and a second point between the first DC-to-DC converter and the electric load.

14. The method according to claim 12, wherein the by-pass comprises a switch device.

15. The method according to claim 12, further comprising, upon detecting a fault in at least one of the second energy storage system, the first DC-to-DC converter, and the second DC-to-DC converter, powering the electric load by the first energy storage system through the bypass and decoupling the second energy storage system from the electric load.

16. The method according to claim 10, further comprising regulating an input current of the second DC-to-DC converter based on an output load of the second DC-to-DC converter in the pre-charge mode.

17. The method according to claim 10, further comprising regulating a bus voltage of the first energy storage system to maintain the bus voltage substantially constant in the normal operation mode.

18. The method according to claim 10, wherein the first energy storage system comprises at least one of a battery and an engine generator, and the second energy storage system comprises an ultra-capacitor.

* * * * *